(No Model.)
H. D. VISER.
DEVICE FOR HOLDING COVERS ON BEDS.
No. 595,221. Patented Dec. 7, 1897.
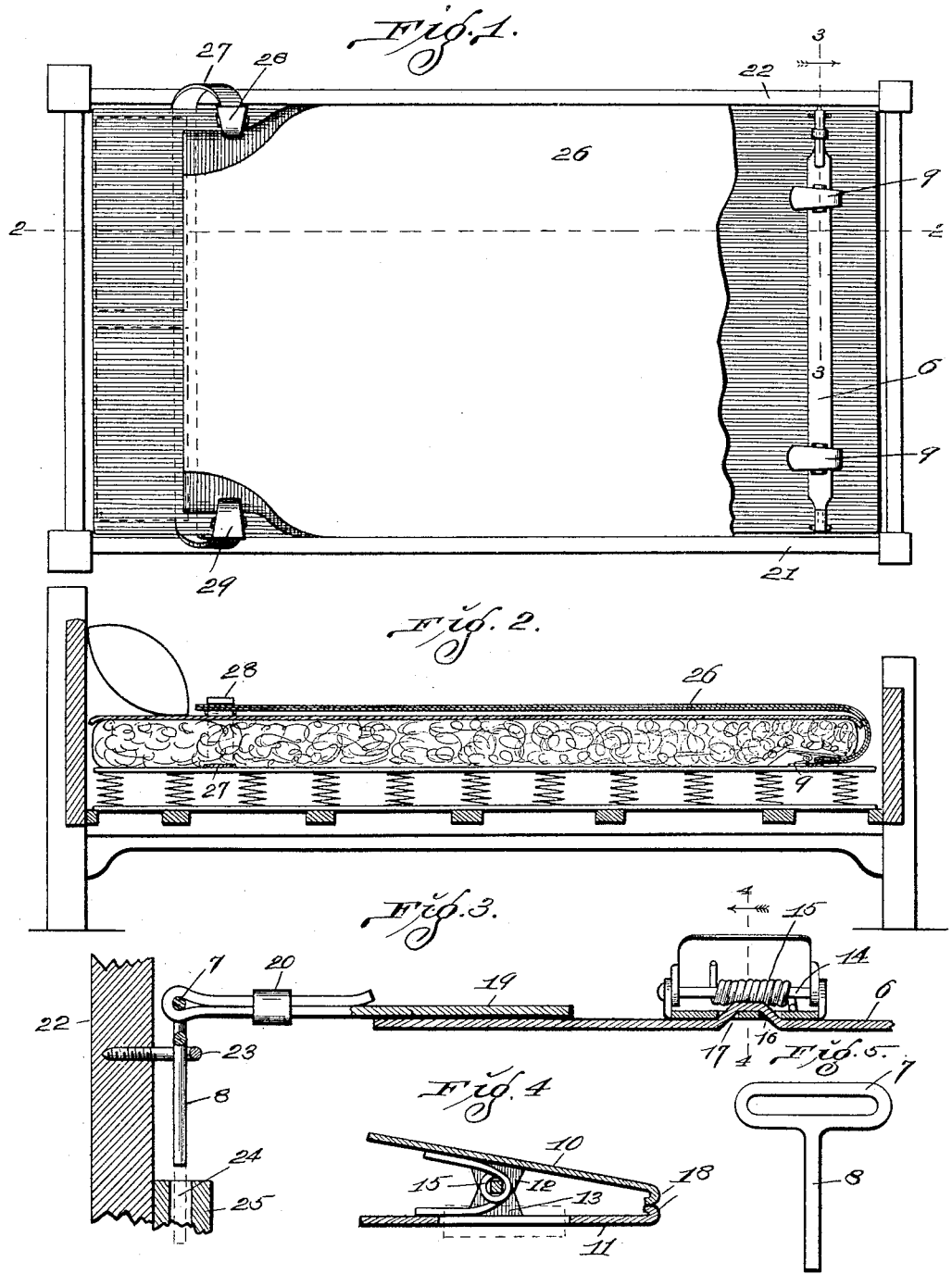
Inventor:—
Henry D. Viser:—
By Higdon Longan & Higdon Att'ys

UNITED STATES PATENT OFFICE.

HENRY D. VISER, OF ST. LOUIS, MISSOURI.

DEVICE FOR HOLDING COVERS ON BEDS.

SPECIFICATION forming part of Letters Patent No. 595,221, dated December 7, 1897.

Application filed March 1, 1897. Serial No. 625,551. (No model.)

*To all whom it may concern:*

Be it known that I, HENRY D. VISER, of the city of St. Louis, State of Missouri, have invented certain new and useful Improvements in Devices for Holding Covers on Beds, of which the following is a full, clear, and exact description, reference being had to the accompanying drawings, forming a part hereof.

My invention relates to devices for holding covers on beds; and it consists of the novel construction, combination, and arrangement of parts hereinafter shown, described, and claimed.

Figure 1 is a top plan view of a bed fitted with my improved device for holding the covers in position, parts being broken away to more clearly illustrate the invention. Fig. 2 is a vertical sectional view taken longitudinally of the bed and approximately on the line 2 2 of Fig. 1. Fig. 3 is a vertical sectional view taken transversely of the bed and approximately on the line 3 3 of Fig. 1 and looking in the direction indicated by the arrow. Fig. 4 is a vertical sectional view taken approximately on the line 4 4 of Fig. 3 and looking in the direction indicated by the arrow. Fig. 5 is a plan view of a loop of which I make use in carrying out the principles of my invention.

In carrying out the principles of my invention I employ the canvas or leather strap 6, one end of which is passed through the elongated loop 7 and folded upon itself and secured in position by suitable stitching or rivets. An arm 8 is formed integral with and projects from one of the long sides of the loop 7. The spring-clasps 9 are placed in position upon the straps 6, as shown in detail in Fig. 3.

The clasps 9 consist of the upper plate 10 and the lower plate 11, pivotally joined together. Ears 12 project downwardly from the side edges and near the center of the upper plate 10, and ears 13 project upwardly from the side edges and near the center of the lower plate 11, and a pin 14 is inserted through said ears, thus forming a pivotal connection between the plates 10 and 11. In placing the pin 14 in position said pin is inserted through the coil-spring 15, which coil-spring is placed between the plates with one of its ends pressing against the plate 10 and its opposite end pressing against the plate 11, as shown in Figs. 3 and 4.

The slots 16 and 17 are formed in positions parallel with each other and extend longitudinally of the plate 11, and the strap 6 is passed under the edge of said plate 11, then upwardly through the slot 16 and downwardly through the slot 17, thus forming a secure but movable or adjustable connection between the clasps 9 and said strap 6. Corresponding ends 18 of each of the clasps are bent inwardly, as shown in Fig. 4, thus forming hook-shaped edges to engage the bed-cover. The tension of the coil-spring 15 is exerted to hold the edges 18 yieldingly together.

The leather strap 19 is attached to the end of the strap 6 opposite the end previously described, and the free end of said strap is passed through the box-loop 20, then through one of the loops 7 and is bent backwardly upon itself and again passed through said loop 20, thus forming a convenient means of adjusting the length of the strap 6. The strap 6, together with the strap 19, is of such a length that it will reach across the bed-spring. One of the loops 7 is placed in position with its arm 8 engaging the screw-eye projecting from the inner face of the side piece 21 of the bed, and the other one of said loops 7 is placed in position engaging the screw-eye projecting inwardly from the side piece 22 of the bed. The arms 8 may pass downwardly from the screw-eyes 23 a short distance, as shown in Fig. 3, or they may pass downwardly through said screw-eyes and into the opening 24 formed in the block 25, which block projects inwardly from the inner face or side rails of the bed. The strap 6 is placed in position transversely of the bed and near the foot and rests upon the springs and with the clasps 9 pointing toward the foot of the bed. The mattress rests upon the strap 6, and when the cover 26 is placed in position upon the mattress the foot edge of said cover is passed under the mattress and is engaged by the clasps 9, as shown in Fig. 2. Any desired number of clasps 9 may be employed and said clasps may be moved to any desired position upon the strap 6.

The canvas or leather strap 27 is placed transversely of the springs and near the head of the bed, and the clasps 28 and 29 are attached to the ends of the strap 27, which strap is somewhat longer than the width of the bed, and when the cover 26 is placed in position the clasps 28 and 29 engage the corners of the cover, as shown in Fig. 1, thus holding said cover securely in position. The clasps 28 and 29 are identical in construction with the clasps 9, with the exception of the means of attaching said clasps to the strap.

I claim—

In a device of the class described, an elongated metal loop 7, the strap 6 having one of its ends passed through said loop, folded upon itself and stitched, the arm 8 formed integral with said loop, the spring-clasps 9 slidingly mounted upon said strap 6, the strap 19 attached to the opposite end of the strap 6 from the first-mentioned loop 7, a second loop 7, through which said strap 19 is inserted, a second arm 8 projecting from said second loop 7 and the screw-eyes 23 projecting inwardly from the side pieces of the bed, said arms 8 being inserted downwardly through said screw-eyes, substantially as specified.

In testimony whereof I affix my signature in presence of two witnesses.

HENRY D. VISER.

Witnesses:
S. G. WELLS,
MAUD GRIFFIN.